(12) United States Patent
Ji et al.

(10) Patent No.: US 12,489,167 B2
(45) Date of Patent: Dec. 2, 2025

(54) BATTERY, ELECTRIC DEVICE, AND BATTERY MANUFACTURING METHOD

(71) Applicant: CONTEMPORARY AMPEREX TECHNOLOGY (HONG KONG) LIMITED, Hong Kong (CN)

(72) Inventors: Hongye Ji, Ningde (CN); Feng Qin, Ningde (CN); Zhanyu Sun, Ningde (CN); Peng Wang, Ningde (CN); Zhi Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 229 days.

(21) Appl. No.: 18/473,916

(22) Filed: Sep. 25, 2023

(65) Prior Publication Data
US 2024/0021947 A1  Jan. 18, 2024

Related U.S. Application Data

(63) Continuation of application No. PCT/CN2021/126818, filed on Oct. 27, 2021.

(51) Int. Cl.
*H01M 50/264* (2021.01)
*H01M 10/613* (2014.01)
*H01M 10/6555* (2014.01)
*H01M 10/6557* (2014.01)
*H01M 10/6568* (2014.01)
*H01M 50/209* (2021.01)
*H01M 50/213* (2021.01)
*H01M 50/291* (2021.01)

(52) U.S. Cl.
CPC ....... *H01M 50/264* (2021.01); *H01M 10/613* (2015.04); *H01M 10/6555* (2015.04);
(Continued)

(58) Field of Classification Search
CPC ............. H01M 50/262; H01M 50/264; H01M 50/242; H01M 10/613; H01M 10/617;
(Continued)

(56) References Cited

U.S. PATENT DOCUMENTS

2013/0183543 A1  7/2013  Yoshioka et al.
2015/0228947 A1  8/2015  Nagamine et al.
(Continued)

FOREIGN PATENT DOCUMENTS

CN  110767858 A  2/2020
CN  212907959 U  4/2021
(Continued)

OTHER PUBLICATIONS

CN110767858 English translation. Li et al. China. Feb. 7, 2020. (Year: 2020).*
(Continued)

*Primary Examiner* — Christopher P Domone
(74) *Attorney, Agent, or Firm* — ANOVA LAW GROUP, PLLC

(57) ABSTRACT

A battery includes at least one row of battery cells, a carrying assembly, and a connecting member. Each row of battery cells includes at least two battery cells arranged along a first direction. The carrying assembly is configured to carry the at least one row of battery cells. The connecting member includes a first connecting plate and a second connecting plate fixedly connected to each other. The first connecting plate is perpendicular to the second connecting plate. The first connecting plate extends in the first direction. The first connecting plate is connected to at least some battery cells in the at least one row of battery cells. The second connecting plate is configured to be fixedly connected to the carrying assembly of the battery.

15 Claims, 8 Drawing Sheets

(52) U.S. Cl.
CPC ... *H01M 10/6557* (2015.04); *H01M 10/6568* (2015.04); *H01M 50/209* (2021.01); *H01M 50/213* (2021.01); *H01M 50/291* (2021.01); *H01M 2220/20* (2013.01)

(58) Field of Classification Search
CPC ......... H01M 10/6555; H01M 10/6554; H01M 10/6557
See application file for complete search history.

(56) References Cited

U.S. PATENT DOCUMENTS

2020/0036063 A1    1/2020  Hirsch et al.
2022/0393290 A1*  12/2022  Seo ..................... H01M 50/209

FOREIGN PATENT DOCUMENTS

| CN | 213071216 U | 4/2021 |
|----|-------------|--------|
| CN | 213340624 U | 6/2021 |

OTHER PUBLICATIONS

The European Patent Office (EPO) Extended Search Report for EP Application No. 21961765.1 Jul. 8, 2024 20 Pages.
The World Intellectual Property Organization (WIPO) International Search Report for PCT/CN2021/126818 Jul. 27, 2022 5 pages (with translation).

\* cited by examiner

BATTERY, ELECTRIC DEVICE, AND BATTERY MANUFACTURING METHOD

CROSS-REFERENCE TO RELATED APPLICATION

This application is a continuation of International Application No. PCT/CN2021/126818, filed on Oct. 27, 2021, the entire content of which is incorporated herein by reference.

TECHNICAL FIELD

This application relates to the field of electrochemical technologies, and in particular to a battery, an electric device, and a battery manufacturing method.

BACKGROUND

Energy conservation and emission reduction are crucial to sustainable development of the automobile industry. In this context, electric vehicles, with their advantages in energy conservation and environmental protection, have become an important part of sustainable development of the automobile industry. For electric vehicles, battery technology is an important factor in connection with their development.

In the development of battery technology, safety of batteries is another non-negligible issue in addition to performance improvement. If the safety of a battery cannot be guaranteed, the battery cannot be used or will lead to a serious safety incident. Therefore, how safety performance of batteries is enhanced is an urgent technical problem that needs to be solved in battery technology.

SUMMARY

Embodiments of this application are intended to provide a battery, an electric device, and a battery manufacturing method to reduce the failure probability of the battery by improving rigidity of battery grouping, and thus improve safety performance of the battery.

A first aspect of this application provides a battery. The battery includes at least one row of battery cells, a carrying assembly, and a connecting member, where each row of the battery cells includes at least two battery cells arranged along a first direction; the carrying assembly is configured to carry the at least one row of battery cells; and the connecting member includes a first connecting plate and a second connecting plate fixedly connected to each other, where the first connecting plate is perpendicular to the second connecting plate, the first connecting plate extends in the first direction, the first connecting plate is connected to at least some battery cells in the at least one row of battery cells, and the second connecting plate is configured to be fixedly connected to the carrying assembly of the battery.

In the battery provided in embodiment of this application, the first connecting plate and the second connecting plate in the connecting member are fixedly connected and disposed perpendicular to each other. The first connecting plate is parallel to each row of battery cells, and side surfaces of the first connecting plate can be fixedly connected to at least two battery cells in one row of battery cells. The second connecting plate can be fixedly connected to the carrying assembly in the battery, so that multiple battery cells can be fastened to the carrying assembly in the battery via the connecting member. The carrying assembly includes but is not limited to a top cover for a housing of the battery, an insulation layer inside the battery, a mica plate and other structural members that can be fixedly connected to the housing of the battery. In this embodiment of this application, the battery cell is fastened to the connecting member and the connecting member is connected to the carrying assembly in the battery, and the second connecting plate of the connecting member can provide a connecting plane for the multiple battery cells, so as to increase the connecting area between the multiple battery cells and the carrying assembly, thereby enhancing connection stability between the multiple battery cells and the carrying assembly. In addition, the first connecting plate can restrain the multiple battery cells, thereby enhancing rigidity of the battery and reducing failure probability of the battery.

In some embodiments, the first connecting plate includes multiple connection zones, each connection zone being connected to the side surface of at least one battery cell, with the connection zone being a cambered surface. Therefore, the connection zones can be better connected to the side surface of the cylindrical battery cell, increasing the contact area between the battery cell and the first connecting plate, thereby reinforcing the connection between the battery cell and the first connecting plate.

In some embodiments, the second connecting plate is provided with a groove on a side near the first connecting plate, where the groove matches the first connecting plate in shape, and part of the first connecting plate is placed in the groove to connect the first connecting plate to the second connecting plate. Therefore, placing part of the first connecting plate into the second connecting plate can increase the contact area between the first connecting plate and the second connecting plate, thereby reinforcing the connection between the first connecting plate and the second connecting plate.

In some embodiments, the first connecting plate is provided with at least one first water cooling channel inside, where the first connecting plate includes a first water inlet and a first water outlet both communicating with the at least one first water cooling channel. Therefore, water can be injected into the first water cooling channel through the first water inlet, the water can absorb heat emitted by the battery cells during circulation in the first water cooling channel, and the water absorbing heat flows out from the first water outlet to cool down the battery cells.

In some embodiments, the battery includes multiple connecting members, multiple first water inlets in multiple first connecting plates of the multiple connecting members communicate with each other, and multiple first water outlets in the multiple first connecting plates communicate with each other. This can improve the efficiency of injecting water into the multiple first water cooling channels and discharging water from the multiple first water cooling channels.

In some embodiments, the battery further includes at least one water cooling plate, where the water cooling plate is located between at least two rows of battery cells, the water cooling plate is provided with at least one second water cooling channel inside, and the water cooling plate includes a second water inlet and a second water outlet both communicating with the at least one second water cooling channel. Therefore, water can be injected into the second water cooling channel through the second water inlet, the water can ab sorb heat emitted by the battery cells during circulation in the second water cooling channel, and the water absorbing heat flows out from the second water outlet to cool down the battery cells.

In some embodiments, the second water inlet communicates with the first water inlet, and the second water outlet communicates with the first water outlet. This can improve the efficiency of injecting water into the multiple first water cooling channels and second water cooling channels and discharging water from the multiple first water cooling channels and second water cooling channels.

In some embodiments, each row of battery cells includes endpoint battery cells located at the outermost of two ends in the first direction, and at least one end of the second connecting plate including two endpoint battery cells at one end in the first direction extends to inner sides of outer contours of the two endpoint battery cells. Therefore, when the two rows of battery cells on two sides of the connecting member are electrically connected, the two ends of the second connecting plate in the first direction can provide an avoidance space for the two rows of battery cells, making it easier for the two rows of battery cells on two sides of the connecting member to be electrically connected.

In some embodiments, the connecting member is provided between every two adjacent rows of the battery cells, so as to further improve stability of the battery.

In some embodiments, the battery includes two rows of battery cells in a second direction, where the connecting members are located on two sides of the two rows of battery cells back away from each other, and the second direction is perpendicular to the first direction. Therefore, the connecting member is used for restraining the overall periphery of the multiple battery cells or the periphery of the battery module formed by the multiple battery cells, so as to further improve the stability of the battery.

In some embodiments, the second connecting plate is connected to at least some battery cells in at least one row of battery cells, so as to further reinforce the connection between the connecting member and the battery cells.

In some embodiments, the battery further includes a connecting piece, where the connecting piece is provided on at least one side of the second connecting plate in a second direction, the second connecting plate is fixedly connected to the carrying assembly via the connecting piece, and the second direction is perpendicular to the first direction. Therefore, the second connecting plate is fixedly connected to the carrying assembly via the connecting piece.

In some embodiments, the connecting piece is provided on both sides of the second connecting plate in the second direction, so that forces on two sides of the second connecting plate are more evenly distributed to enhance the connection stability between the second connecting plate and the carrying assembly.

In some embodiments, the battery further includes a reinforcing structure, the reinforcing structure connecting the second connecting plate to the first connecting plate. This reduces the possibility of the first connecting plate being broken or damaged, thereby enhancing the connection between the first connecting plate and the second connecting plate.

A second aspect of the embodiments of this application provides an electric device, where the electric device includes the battery according to any one of the foregoing embodiments.

A third aspect of an embodiment of this application provides a battery manufacturing method, where the battery manufacturing method includes:
  providing at least one row of battery cells, each row of the battery cells including at least two battery cells arranged along a first direction;
  providing a carrying assembly configured to carry the at least one row of battery cells; and
  providing a connecting member, the connecting member including a first connecting plate and a second connecting plate fixedly connected to each other, where the first connecting plate is perpendicular to the second connecting plate, the first connecting plate extends in the first direction, the first connecting plate is connected to at least some battery cells in the at least one row of battery cells, and the second connecting plate is configured to be fixedly connected to the carrying assembly of the battery.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other embodiments from these accompanying drawings without creative efforts.

DESCRIPTION OF EMBODIMENTS

Figure 1:
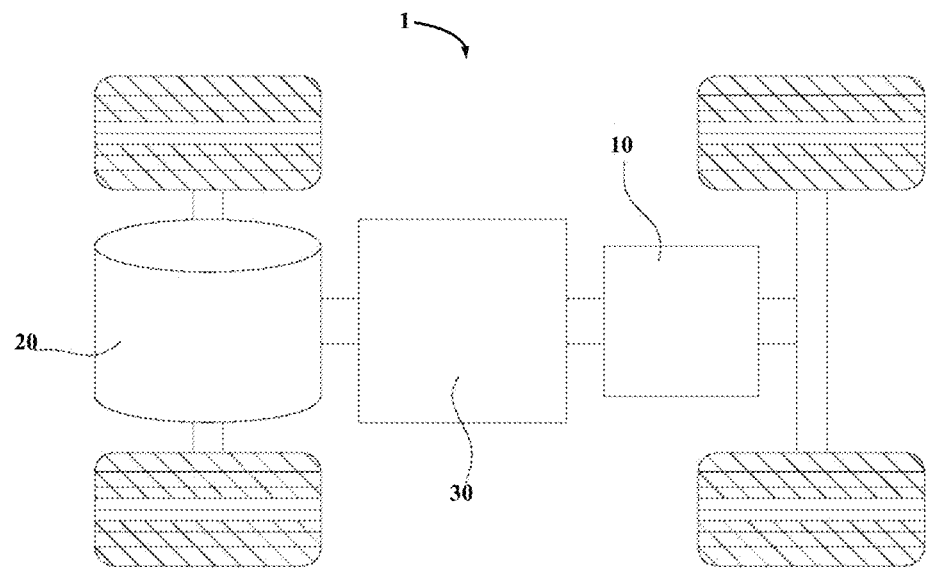
FIG. 1 is a schematic diagram of a structure of a vehicle according to some embodiments of this application.

To make the objectives, technical solutions, and advantages of this application more comprehensible, the following describes this application in detail with reference to accompanying drawings and embodiments. Apparently, the described embodiments are merely some but not all of the embodiments of this application. All other embodiments obtained by persons of ordinary skill in the art based on the embodiments of this application without creative efforts shall fall within the protection scope of this application.

It should be understood that the terms used in the specification is merely intended for describing particular exemplary embodiments and is not intended set limitations. Unless otherwise clearly specified in the context, the singular forms "one", "a" and "the" as used in the specification may also be expressed to include the plural forms. The terms "include", "comprise", "contain", and "have" are non-exclusive and thus specify the presence of the stated features, steps, operations, components, and/or parts, but do not preclude the presence or addition of one or more other features, steps, operations, components, parts, and/or combinations thereof. The method steps, processes, and operations described in the specification are not to be construed as necessarily requiring that they be performed in a particular order in which they are described or illustrated, unless the order of performance is clearly indicated. It should further be understood that additional or alternative steps may be used.

Although the terms first, second, third, and the like may be used in the specification to describe multiple elements, parts, zones, layers, and/or sections, such elements, parts, zones, layers, and/or sections should not be limited by such terms. These terms may be used only to distinguish one element, component, zone, layer, or section from another zone, layer, or section. Unless otherwise clearly specified in the context, terms such as "first", "second", and other numerical terms are used in the specification without implying order or sequence. Accordingly, the first element, part, zone, layer, or section discussed below may be referred to as a second element, part, zone, layer, or section without departing from the instructions of the exemplary embodiment.

For ease of description, relative space position relation terms may be used in the text to describe the relationship of an element or feature to another element or feature as illustrated in the figures, such as "inside", "outside", "inner side", "outer side", "under", "below", "on", "above", and the like. These relative space position relation terms are intended to include different orientations of an apparatus in use or operation other than the orientation depicted in the drawings. For example, if a means in a drawing is flipped over, an element described as being "under" or "below" another element or feature will then be oriented as being "on" or "above" the another element or feature. Therefore, the exemplary term "below . . . " may include both up and down orientations. The apparatus may be oriented in other ways, for example, rotated 90 degrees or positioned in another direction, and the relative spatial relation descriptors used in the text are interpreted accordingly.

FIG. 1 is a schematic diagram of a structure of a vehicle according to an embodiment of this application. The vehicle 1 may be a fossil fuel vehicle, a natural-gas vehicle, or a new energy vehicle, where the new energy vehicle may be a battery electric vehicle, a hybrid electric vehicle, a range-extended vehicle, or the like. A motor 30, a controller 20, and a battery 10 may be provided inside the vehicle 1, where the controller 20 is configured to control the battery 10 to supply power to the motor 30. For example, the battery 10 may be disposed at the bottom, front, or rear of the vehicle 1. The battery 10 may be configured to supply power to the vehicle 1. For example, the battery 10 may be used as an operational power source for the vehicle 1 which is configured for a circuit system of the vehicle 1, for example, to satisfy power needs of start, navigation, and running of the vehicle 1. In another embodiment of this application, the battery 10 can be used not only as the operational power source for the vehicle 1, but also as a driving power source for the vehicle 1, replacing or partially replacing fossil fuel or natural gas to provide driving traction for the vehicle 1.

Figure 2:
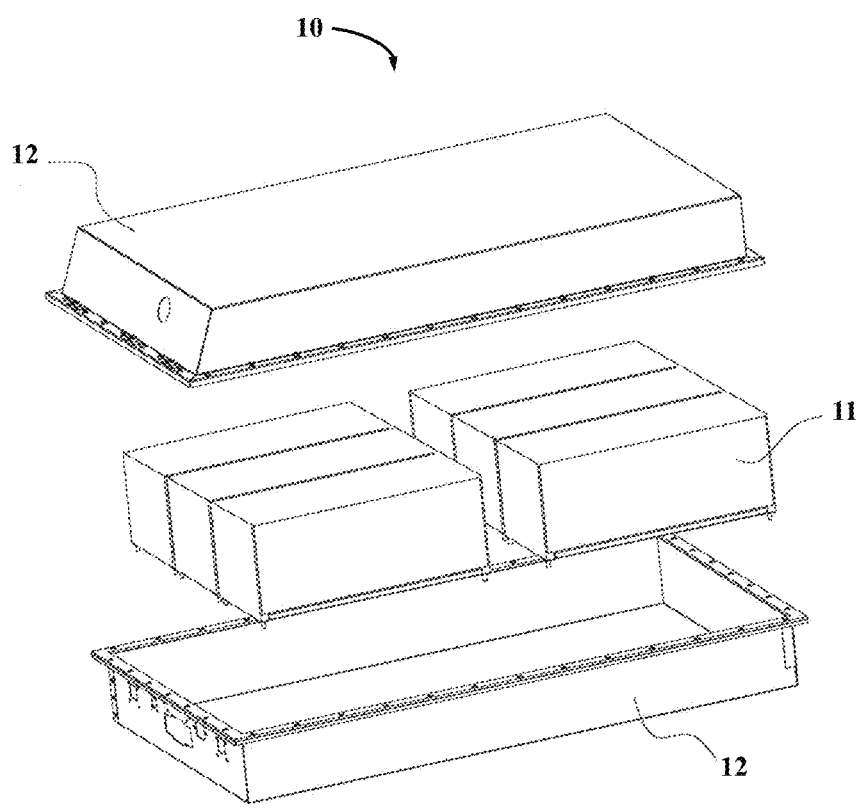
FIG. 2 is a schematic diagram of a structure of a battery according to some embodiments of this application.

The battery mentioned in the embodiments of this application is a single physical module that includes one or more battery cells for providing a higher voltage and capacity. For example, as shown in FIG. 2, the battery 10 mentioned in this application may include a battery module 11, a battery pack, or the like. The battery 10 typically includes a box 12 configured to enclose one or more battery cells. The box 12 can prevent liquids or other foreign matter from affecting charging or discharging of the battery cell.

Multiple battery cells may be connected in series and/or in parallel through a pole for various application scenarios. In some high-power application scenarios such as an electric vehicle, the application of the battery includes three levels: a battery cell, a battery module, and a battery pack. The battery module is formed by electrically connecting a specific quantity of battery cells and putting the battery cells into a frame to protect the battery cells from external impact, heat, vibration, and the like. The battery pack is a final state of a battery system assembled in an electric vehicle. Generally, a battery pack includes a box configured to package one or more battery cells. The box can prevent liquids or other foreign matter from affecting charging or discharging of the battery cell. A box typically includes a cover and a box housing. Most existing battery packs are formed by assembling various control and protection systems such as a battery management system (BMS) and a thermal management component on one or more battery modules. With the development of technologies, the battery module may be omitted, that is, the battery pack is directly formed using battery cells. With this improvement, weight energy density and volumetric energy density of the battery system are improved, and a quantity of components is remarkably reduced. The battery mentioned in this application includes a battery module or a battery pack.

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell. The type of battery is not limited in the embodiments of this application either.

In order to improve safety of battery cells in case of thermal runaway, an electrical connection part and an explosion-proof valve of the battery cell can be respectively set on two sides of the battery cell, such as respectively on the upper and lower sides of the battery cell, so that a structure design without thermal diffusion can be more easily implemented for the battery cell, thereby improving the safety of the battery cells and reducing the possibility of thermal runaway of the battery cells. In a case that multiple battery cells are grouped to form a battery module and a battery pack, because the electrical connection part and explosion-proof valve of the battery cell are respectively located on the upper and lower sides of the battery cell, both end surfaces of the battery cell are not flat plane structures, and the grouped batteries cannot provide a relatively flat surface for connection with the box, box cover, and other carrying assemblies of the battery pack, causing the connection between the battery cell and the carrying assemblies of the battery pack less stable.

In such a battery pack structure, the battery cell needs to be connected to the carrying assembly by bonding. However, when the electrically connected side of the battery cell is bonded to the carrying assembly, an adhesive layer is thick and uneven in thickness, resulting in a high risk of electrical connection failure of the battery cell. In addition, the electrically connected side directly bears the force on the box, which also leads to a high risk of electrical connection failure. When the explosion-proof valve side of the battery cell is connected to the carrying assembly, the adhesive covers the explosion-proof valve, making it difficult for the explosion-proof valve to exhaust smoothly, and reducing the safety of the battery cell.

When the upper and lower end surfaces of the battery cell cannot be connected to the battery pack structure using structural adhesive, all the battery cells can only be restrained by the peripheral restraint members such as end plates or side plates on the periphery of the battery module. In other words, when the multiple battery cells are arranged in multiple rows and columns, the battery restraint member are only in contact with the outer side of the outermost row or column of battery cells, so as to restrain all the battery cells and implement grouping of the multiple battery cells. If only the battery cells located on the periphery are constrained, multiple battery cells located inward of them are less constrained, making it impossible to ensure that every battery cell is positioned with effective displacement restrictions. As a result, the overall rigidity of the battery is poor, and the amplitude of the middle part of the battery is large, leading to a high risk of failure. The main frequency of the entire battery pack is low, making it prone to resonance. Given the many problems of the foregoing battery, the inventors have developed a new battery, that is, the battery in this application. Multiple battery cells are fastened to a connecting member, and the connecting member is connected to a carrying assembly of the battery, providing a connecting plane for the multiple battery cells. This increases the connecting area between the multiple battery cells and the carrying assembly, enhances connection stability between the multiple battery cells and the carrying assembly, improves rigidity of the battery, and reduces failure probability of the battery.

The technical solution described in embodiments of this application is applicable not only to a battery including battery cells that are not flat on both upper and lower sides, but also to a battery including battery cells that are not flat on one side. In addition, the technical solutions in the embodiments of this application are applicable to various apparatuses that use batteries, for example, mobile phones, portable devices, notebook computers, electric bicycles, electric toys, electric tools, electric vehicles, ships, and spacecrafts. For example, spacecrafts include airplanes, rockets, space shuttles, and spaceships.

As shown in FIG. 3 to FIG. 14, the battery 10 according to the embodiments of this application includes at least one row of battery cells 110, a carrying assembly 120, and a connecting member 130. Each row of battery cells 110 includes at least two battery cells 110 arranged along a first direction. The carrying assembly 120 is used to carry the at least one row of battery cells 110. The connecting member 130 includes a first connecting plate 131 and a second connecting plate 132 that are fixedly connected. The first connecting plate 131 is perpendicular to the second connecting plate 132, and the first connecting plate 131 extends in the first direction. The first connecting plate 131 is connected to at least some battery cells 110 in the at least one row of battery cells 110, and the second connecting plate 132 is configured to be fixedly connected to the carrying assembly 120 of the battery 10.

In this embodiment of this application, the battery cells 110 may be rectangular batteries, cylindrical batteries, prismatic batteries, or the like. The battery cell 110 is of a structure in which an electrical connection structure protruding from one end surface and an explosion-proof valve is formed on the other end surface; or may be of a structure in which both the electrical connection structure and the additional components such as the explosion-proof valve are on a same side; or may be of a battery cell structure in which neither the electrical connection structure nor the explosion-proof valve protrudes from the outer shell of the battery cell 110.

At least one row of battery cells 110 consists of at least two battery cells 110 arranged side by side in a first direction, and the at least two battery cells 110 can be connected in parallel or in series. The at least one row of battery cells 110 may be connected to a connecting member 130 so as to be connected to the carrying assembly 120 of the battery 10 via the connecting member 130.

The first direction may be a thickness direction of the battery 10 or the battery cell 110. For example, when the battery cell 110 is a cylindrical battery cell, the first direction is a direction perpendicular to an axis of the battery cell 110.

The carrying assembly 120 is a structure that is connected to the battery cells 110 in the battery 10 to support and fasten the battery cells 110. The carrying assembly 120 includes but is not limited to a box, a side wall of the box, a top cover of the box, an insulation piece or a mica plate inside the battery, and the like.

The connecting member 130 is configured to connect the battery cell 110 to the carrying assembly 120. Specifically, the first connecting plate 131 in the connecting member 130 is configured to connect to the battery cell 110, and the second connecting plate 132 in the connecting member 130 is configured to connect to the carrying assembly 120, so as to connect the battery cell 110 to the carrying assembly 120.

The first connecting plate 131 is connected to a side surface of the battery cell 110, and the first connecting plate 131 matches a side surface of the battery cell 110 in shape, so as to be stably connected to the battery cell 110. Specifically, if the battery cell 110 is cylindrical, the first connecting plate 131 is formed with a cambered surface to fit with the cylindrical battery cell 110. If the battery cell 110 is a rectangular battery, the first connecting plate 131 has an overall flat shape that matches a side surface of the rectangular battery in shape.

The second connecting plate 132 is configured to connect to the carrying assembly 120, and the whole second connecting plate 132 may be flat to provide a relatively flat plane for connecting to the carrying assembly 120.

The first connecting plate 131 is perpendicular to the second connecting plate 132, so as to form a semi-open accommodating space between the first connecting plate 131 and the second connecting plate 132 for fastening the multiple battery cells 110 in the accommodating space.

In the battery 10 according to this embodiment of this application, the first connecting plate 131 and second connecting plate 132 in the connecting member 130 are fixedly connected and disposed perpendicular to each other. The first connecting plate 131 is parallel to each row of battery cells 110, and side surfaces of the first connecting plate 131 can be fixedly connected to at least two battery cells 110 in one row of battery cells 110. The second connecting plate 132 can be fixedly connected to the carrying assembly 120 in the battery 10, so that the multiple battery cells 110 can be fastened to the carrying assembly 120 via the connecting member 130. Since the battery cells 110 are fastened to the connecting member 130 and the connecting member 130 is connected to the carrying assembly 120, the second connecting plate 132 of the connecting member 130 can provide a connecting plane for the multiple battery cells 110, so as to increase the connecting area between the multiple battery cells 110 and the carrying assembly 120, thereby enhancing connection stability between the multiple battery cells 110 and the carrying assembly 120. In addition, the first connecting plate 131 can restrain the multiple battery cells 110, thereby enhancing rigidity of the battery 10 and reducing failure probability of the battery 10.

In some embodiments, the side surfaces of the first connecting plate 131 can be fixedly connected to all battery cells 110 in one row of battery cells 110 to increase the number of battery cells 110 connected to the first connecting plate 131, so that the connecting member 130 provides a connection plane for more battery cells 110, further increasing the stability of the battery 10.

In some embodiments, the battery 10 includes multiple rows of battery cells 110, and a connecting member 130 is provided between each two adjacent rows of battery cells 110. Each two adjacent rows of battery cells 110 are connected to the first connecting plate 131 of one connecting member 130, so as to connect to the carrying assembly 120 via the connecting member 130. This can further increase the stability of the battery 10. Further, the first connecting plate 131 is bonded to the battery cells 110.

In some embodiments, the first connecting plate 131 includes multiple connection zones 1311, each connection zone 1311 being connected to the side surface of at least one battery cell 110, with the connection zone 1311 being a cambered surface.

Figure 5:
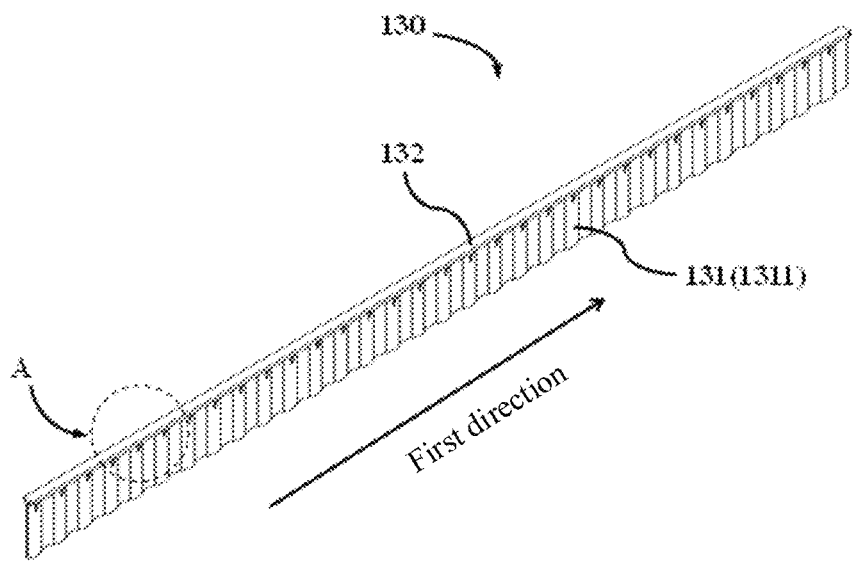
FIG. 5 is a schematic diagram of a structure of a connecting member according to some embodiments of this application.
Figure 6:
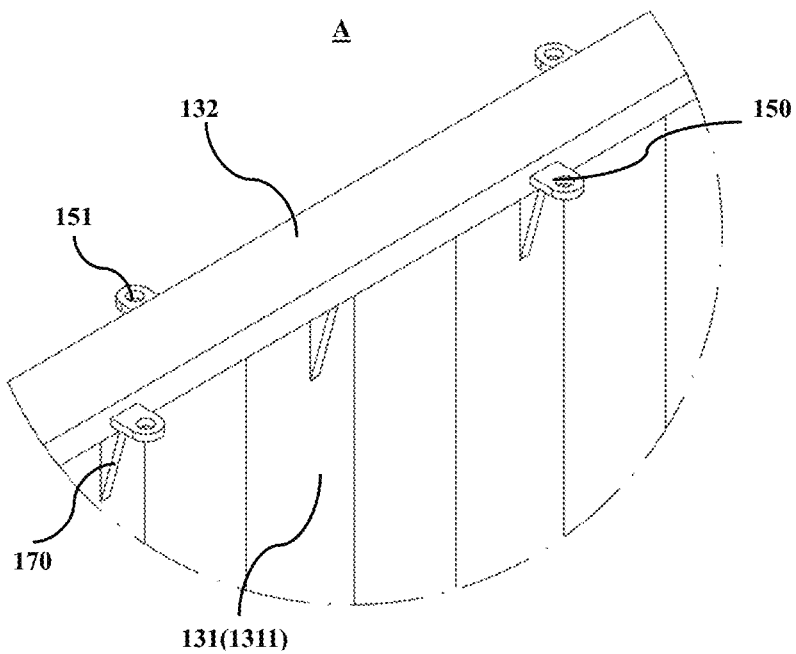
FIG. 6 is a partially enlarged view of zone A in FIG. 5.

In this embodiment of this application, the connection zone 1311 of the first connecting plate 131 is configured to connect to the side surface of the battery cell 110, that is, to one of the side surfaces connecting the upper and lower end surfaces of the battery cell 110, so as to connect the multiple battery cells 110 and the first connecting plate 131. As shown in FIG. 5 and FIG. 6, when the battery cell 110 is a cylindrical battery cell, the cylindrical battery cell has an overall cambered side surface, so when the connection zone 1311 is a cambered surface, the connection zone 1311 can be better connected to a side surface of the cylindrical battery cell 110, increasing the contact area between the battery cell 110 and the first connecting plate 131, and reinforcing the connection between the battery cell 110 and the first connecting plate 131.

Further, as shown in FIG. 5 and FIG. 6, two adjacent connection zones 1311 in the first direction have opposite opening directions. Two adjacent connection zones 1311 on the same first connecting plate 131 have opposite opening directions, so that both sides of the first connecting plate 131 can be connected to the battery cells 110 when the first connecting plate 131 is placed between two rows of battery cells 110, as shown in FIG. 4. This can increase the available area on the first connecting plate 131 and reduce material waste. In addition, in the second direction in FIG. 3, two adjacent connection zones 1311 may be have the same or different opening directions. This is not specifically limited in this embodiment of this application.

Figure 7:
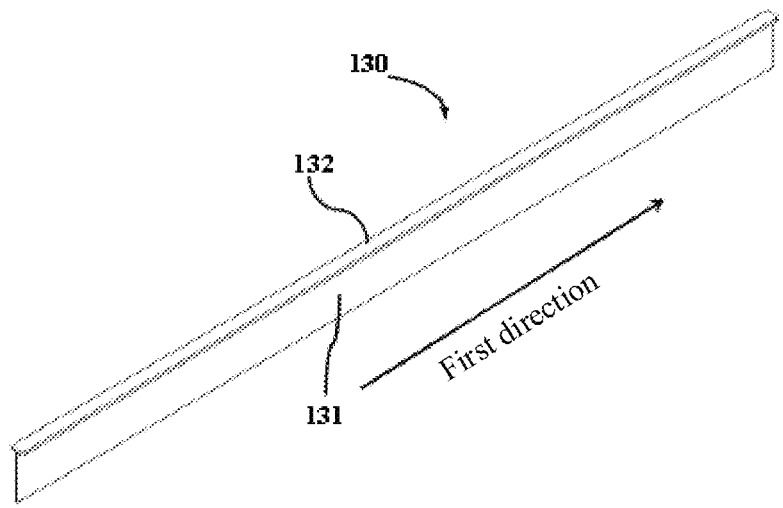
FIG. 7 is a schematic diagram of another structure of a connecting member according to some embodiments of this application.
Figure 10:
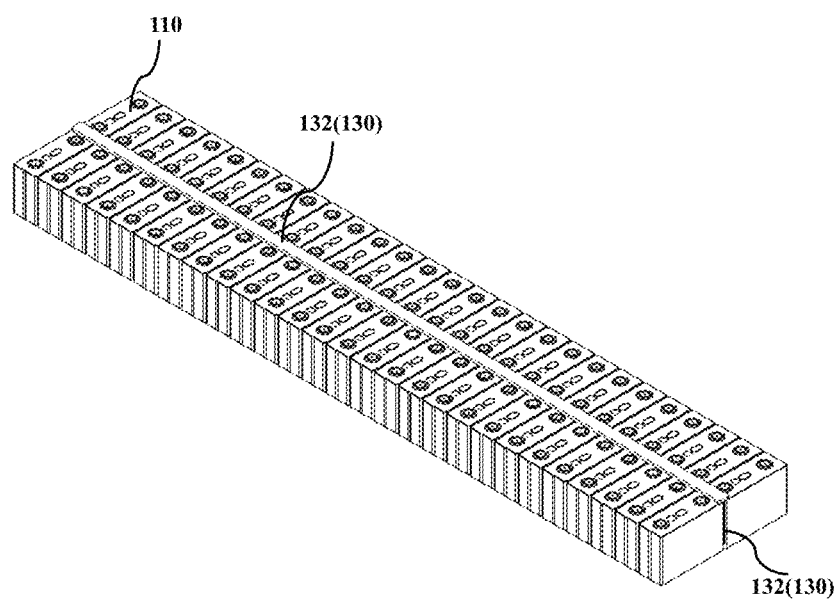
FIG. 10 is a schematic diagram of another structure of a connecting member connected with battery cells according to some embodiments of this application.

Further, as shown in FIG. 7 and FIG. 10, when the battery cell 110 has flat side surfaces, for example, when the battery cell 110 is a flat battery cell or a rectangular battery cell, the multiple connection zones 1311 on the first connecting plate 131 are flat and connected as one for better connection with the side surfaces of the battery cell.

Figure 13:
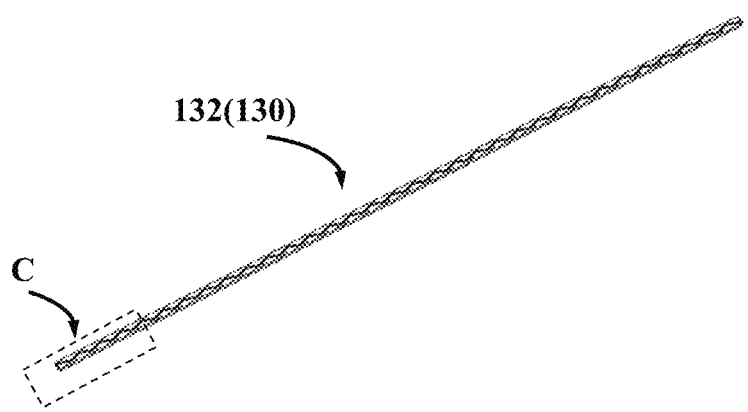
FIG. 13 is a schematic diagram of a structure of a second connecting plate according to some embodiments of this application.
Figure 14:
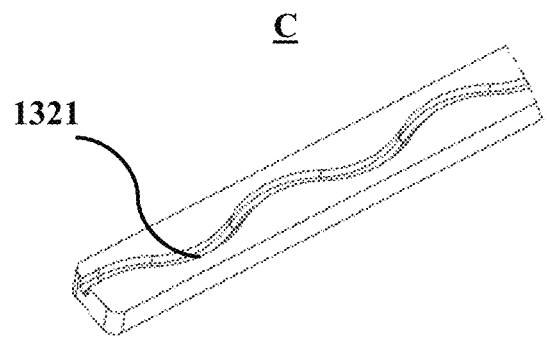
FIG. 14 is an enlarged schematic view of zone C in FIG. 13.

In some embodiments, as shown in FIG. 13 and FIG. 14, the second connecting plate 132 is provided with a groove 1321 on a side near the first connecting plate 131, where the groove 1321 matches the first connecting plate 131 in shape, and part of the first connecting plate 131 is placed in the groove 1321 to connect the first connecting plate 131 to the second connecting plate 132.

In this embodiment of this application, the groove 1321 is disposed on a side surface of the second connecting plate 132 for connecting with the first connecting plate 131, and the shape of the groove 1321 is substantially the same as the shape of the first connecting plate 131 so that the upper side of the first connecting plate 131 can be inserted into the groove 1321 to connect the first connecting plate 131 to the second connecting plate 132. Specifically, as shown in FIG. 13, when the first connecting plate 131 has multiple connection zones 1311 with cambered surfaces, the groove 1321 is in a wavy shape. Correspondingly, when the connection zones 1311 are flat, the groove 1321 is in a long-strip shape. In this embodiment of this application, part of the first connecting plate 131 is inserted into the second connecting plate 132, which can increase the contact area between the first connecting plate 131 and the second connecting plate 132, thereby reinforcing the connection between the first connecting plate 131 and the second connecting plate 132. Further, the groove 1321 may run through the second connecting plate 132 to further increase the contact area between the first connecting plate 131 and the second connecting plate 132.

In some embodiments, the first connecting plate 131 is bonded to the second connecting plate 132, or the first connecting plate 131 is welded to the second connecting plate 132. In this case, the first connecting plate 131 and the second connecting plate 132 may be directly bonded or welded together. Alternatively, the first connecting plate 131 may be further fixedly connected by bonding or brazing after snap-connected to the second connecting plate 132 via the groove 1321, so as to reinforce the connection between the first connecting plate 131 and the second connecting plate 132. Further, the first connecting plate 131 and the second connecting plate 132 may alternatively be an integrally formed structure.

In some embodiments, the connecting member 130 is a plastic member. Plastic is insulating, and a plastic connecting member 130 can reduce influence of the connecting member 130 on the battery cell 110.

In some embodiments, the connecting member 130 is a metal member, making the connecting member 130 more rigid and harder. When the connecting member 130 is a metal member, the surface of the connecting member 130 is coated with an insulation layer to reduce influence of the connecting member 130 on the battery cell 110.

Figure 15:
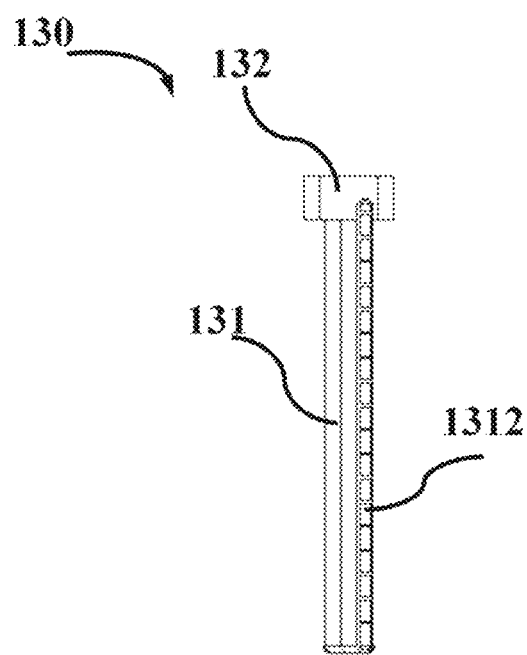
FIG. 15 is a side view of a connecting member according to some embodiments of this application.

In some embodiments, as shown in FIG. 15, at least one first water cooling channel 1312 is provided in the first connecting plate 131, and the first connecting plate 131 includes a first water inlet (not shown in the figure) and a first water outlet (not shown in the figure) both communicating with the at least one first water cooling channel 1312.

In this embodiment of this application, as shown in FIG. 15, the first connecting plate 131 may also be used for a cooling structure for cooling the battery cell 110 fastened to the first connecting plate 131. Water can be injected into the first water cooling channel 1312 through the first water inlet, the water can absorb heat emitted by the battery cells 110 during circulation in the first water cooling channel 1312, and the water absorbing heat flows out from the first water outlet to cool down the battery cells 110. Further, the first water cooling channel 1312 may extend from one end of the first connecting plate 131 to the other end in the first direction, so that the water in the first water cooling channel 1312 can absorb as much heat as possible from the battery cell 110.

In some embodiments, the battery 10 includes multiple connecting members 130, first water inlets in multiple first connecting plates 131 of the multiple connecting members 130 communicate with each other, and first water outlets in the multiple first connecting plates 131 communicate with each other. The multiple first water inlets communicate with each other. Therefore, when water needs to be injected into multiple first water cooling channels 1312, water can be injected through only one first water inlet, the water can enter all the first water cooling channels 1312 through the first water inlets in communication, and the water in all first water cooling channels 1312 can flow out through one first water outlet, thereby improving the efficiency of injecting water into and discharging water from the multiple first water cooling channels 1312.

Figure 11:
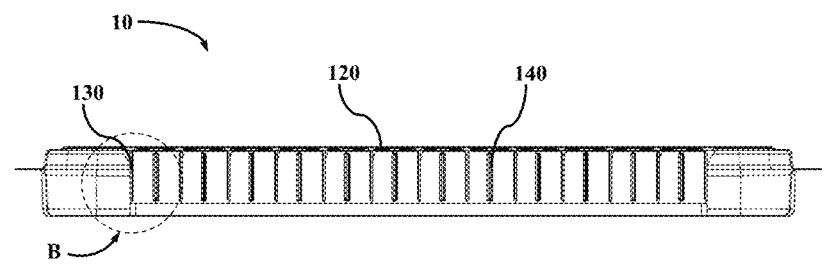
FIG. 11 is a side view of a battery according to some embodiments of this application.
Figure 12:
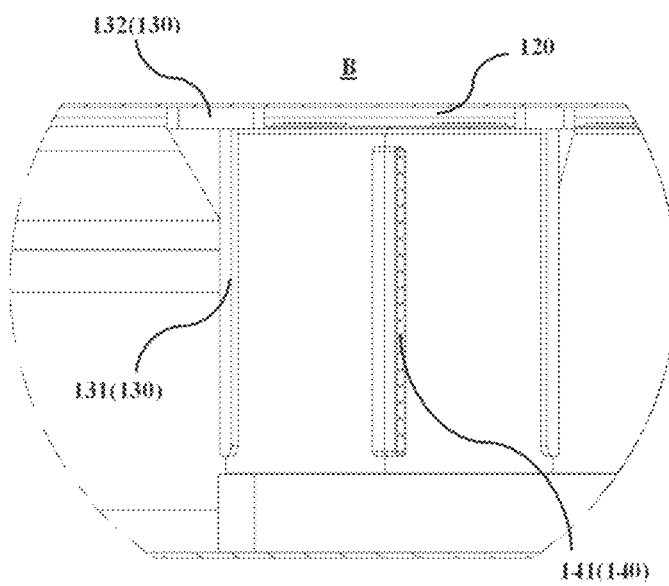
FIG. 12 is an enlarged schematic view of zone B in FIG. 11.

In some embodiments, as shown in FIG. 11 and FIG. 12, the battery 10 further includes at least one water cooling plate 140, where the water cooling plate 140 is located between at least two rows of battery cells 110, the water cooling plate 140 is provided with at least one second water cooling channel 141 inside, and the water cooling plate 140 includes a second water inlet and a second water outlet both communicating with the at least one second water cooling channel 141.

In this embodiment of this application, the water cooling plate 140 is a structure capable of absorbing heat from the battery cells 110 to cool down the battery cells 110. The structure and shape of the water cooling plate 140 can be substantially the same as the first connecting plate 131. The water cooling plate 140 is provided with the second water cooling channel 141. Water can be injected into the second water cooling channel 141 through the second water inlet, water can absorb heat emitted by the battery cells 110 during circulation in the second water cooling channel 141, and the water absorbing heat flows out from the second water outlet (not shown in the figure) to cool down the battery cells 110. Further, the water cooling plate 140 may be connected to two rows of battery cells 110 on two sides of the water cooling plate 140 to fasten the battery cells 110.

In some embodiments, the second water inlet communicates with the first water inlet, and the second water outlet communicates with the first water outlet. The second water inlet on the water cooling plate 140 communicates with the first water inlet on the first connecting plate 131, and the second water outlet on the water cooling plate 140 communicates with the second water outlet on the first connecting plate 131. When water needs to be injected into multiple first water cooling channels 1312 and second water cooling channels 141, water can be injected through only one first water inlet, and the water can enter all first water cooling channel 1312 and second water cooling channels 141 through the first water inlets and second water inlets in communication, and the water in all first water cooling channels 1312 and second water cooling channels 141 can flow out through one first water outlet, thereby improving the efficiency of injecting water into and discharging water from the multiple first water cooling channels 1312 and the multiple second water cooling channels 141.

Figure 3:
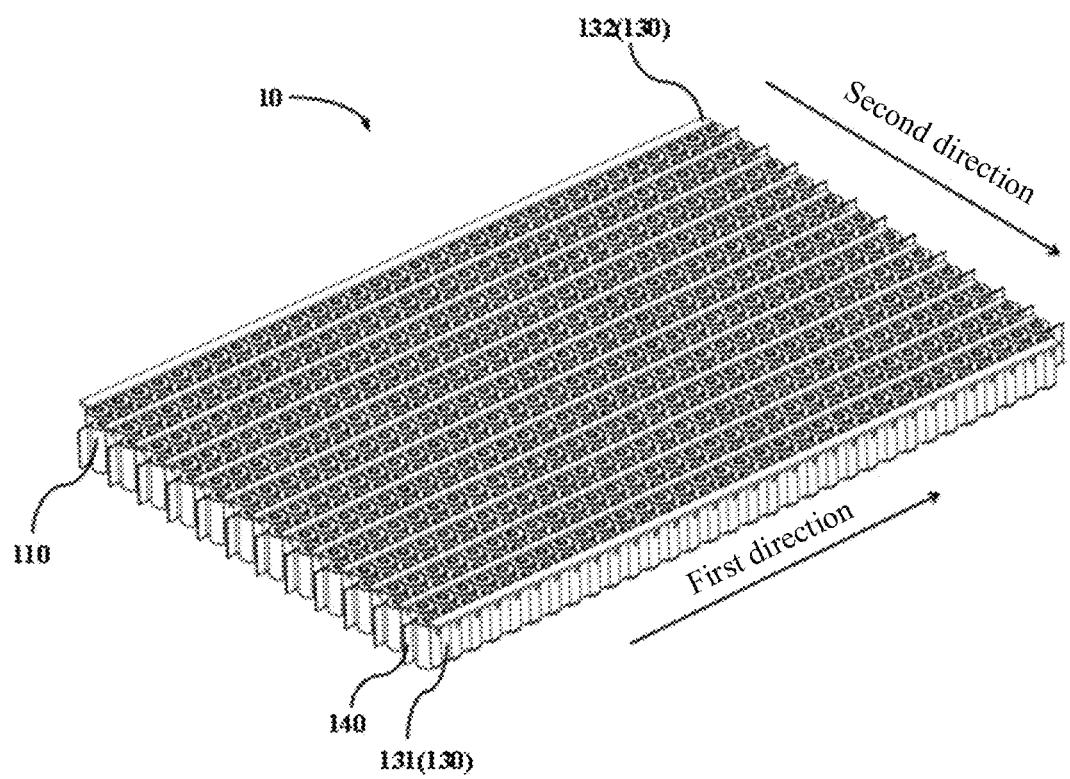
FIG. 3 is a schematic diagram of a partial structure of a battery according to some embodiments of this application.
Figure 4:
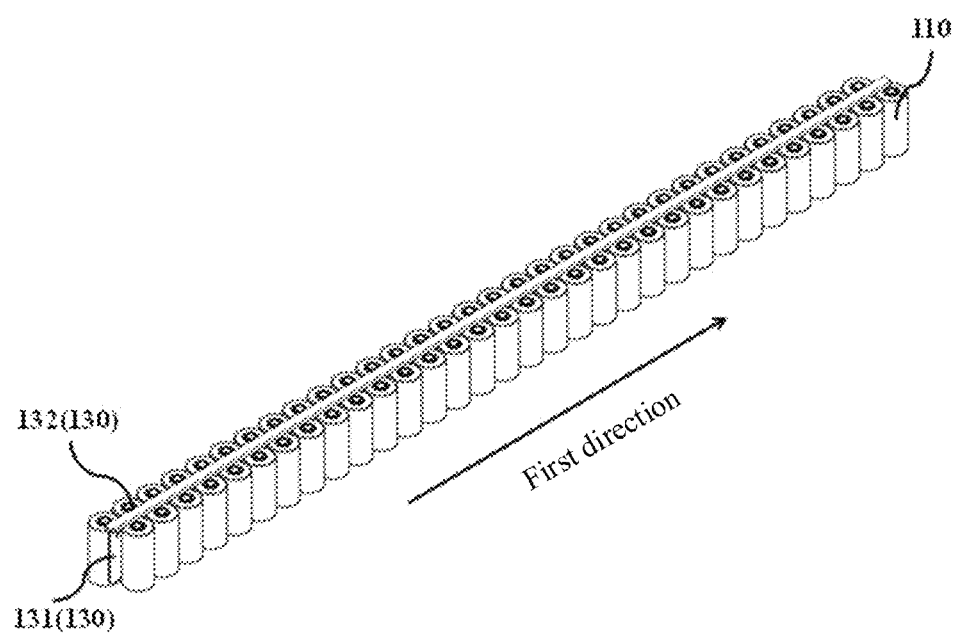
FIG. 4 is a schematic diagram of a structure of a connecting member connected with battery cells according to some embodiments of this application.

In some embodiments, as shown in FIG. 3, in a second direction, the battery 10 includes two rows of battery cells 110, where the connecting members 130 are located on two sides of the two rows of battery cells 110 back away from each other, and the second direction is perpendicular to the first direction.

In this embodiment of this application, as shown in FIG. 3, FIG. 11 and FIG. 12, the battery 10 has two rows of battery cells 110 at the outermost side in the first direction, and a connecting member 130 is provided on an outer side of each of the two rows of battery cells 110. The connecting member 130 is used for restraining the overall periphery of the multiple battery cells 110 or the periphery of the battery 10 formed by multiple battery cells 110, further increasing the stability of the battery 10. Further, two connecting members 130 may further be provided on two sides of the battery 10 in the first direction, such that the periphery of each side of the battery is restrained by the connecting member 130, further increasing the stability of the battery 10.

In some embodiments, the second connecting plate 132 is connected to at least some battery cells 110 in at least one row of battery cells 110. Specifically, a side surface of the second connecting plate 132 close to the multiple battery cells 110 is connected to a shoulder of the battery cells 110, where the shoulder can be understood as a zone on the upper or lower end surface of the battery cell 110 other than the part on which the explosion-proof valve and the electrical connection structure are disposed. The second connecting plate 132 is connected to the battery cell 110 to further enhance connection stability between the connecting member 130 and the battery cell 110. Further, the second connecting plate 132 may be connected to all battery cells 110 in the row of battery cells 110 located below. Further, the second connecting plate 132 is bonded to the multiple battery cells 110.

In some embodiments, each row of battery cells 110 includes endpoint battery cells 111 located at the outermost of two ends in the first direction, and at least one end of the second connecting plate 132 including two endpoint battery cells 111 at one end in the first direction extends to inner sides of outer contours of the two endpoint battery cells 111.

Figure 16:
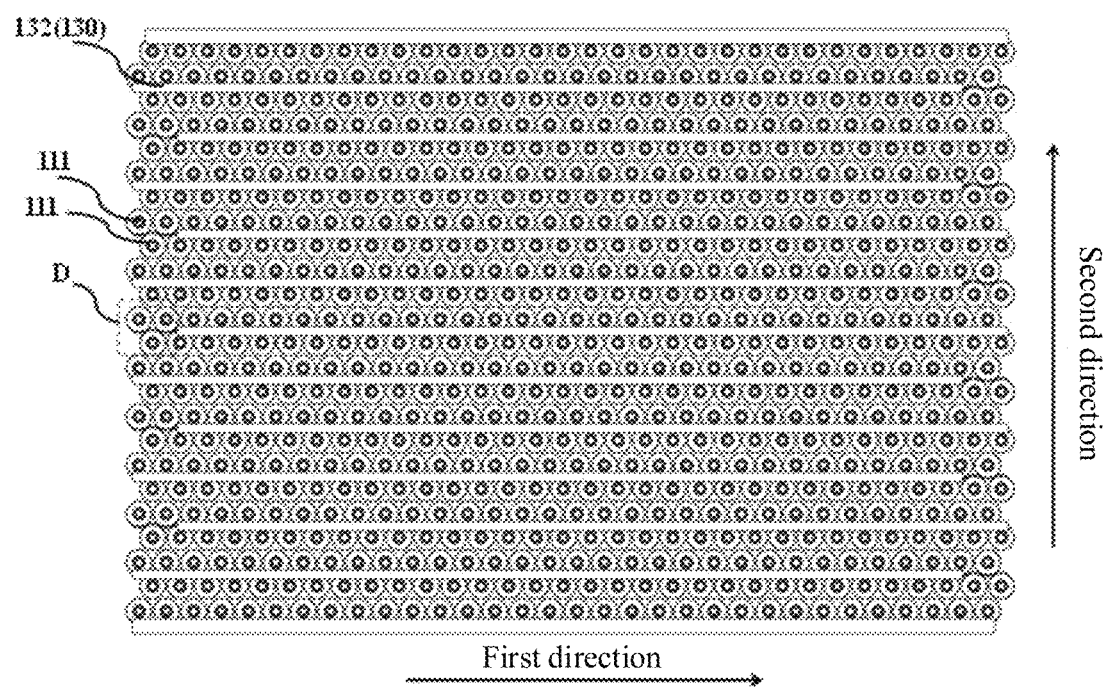
FIG. 16 is a schematic diagram of still another partial structure of a battery according to some embodiments of this application.

In this embodiment of this application, as shown in FIG. 16, in the second direction, each side of the first connecting plate 131 of the connecting member 130 may be connected to one row of battery cells 110, such that the second connecting plate 132 has two battery cells at each end in the first direction. The endpoint battery cell 111 is the outermost battery cell 110 in each row of battery cells 110 in the first direction, and at least one end of the second connecting plate 132 extends to inner sides of outer contours of the two endpoint battery cells 111, such that one end of the second connecting plate 132 does not cover the upper ends of the two endpoint battery cells 111. When the two rows of battery cells 110 on both sides of the connecting member 130 are electrically connected, the two ends of the second connecting plate 132 in the first direction can provide an avoidance space for the two rows of battery cells 110 (zone D in FIG. 16), making it easier for the two rows of battery cells 110 on both sides of the connecting member 130 to be electrically connected.

In some embodiments, the battery 10 further includes a connecting piece 150. The connecting piece 150 is provided on at least one side of the second connecting plate 132 in the second direction, the second connecting plate 132 is fixedly connected to the carrying assembly 120 via the connecting piece 150, and the second direction is perpendicular to the first direction.

In this embodiment of this application, the connecting piece 150 is a connecting member 130 for connecting the second connecting plate 132 and the carrying assembly 120. The connecting piece 150 may be a plastic piece, a metal piece, or the like. Further, the connecting piece 150 is provided on the second connecting plate 132, and the connecting piece 150 is configured to connect the second connecting plate 132 and the carrying assembly 120. As shown in FIG. 1, the second direction is perpendicular to the first direction, and the second direction is perpendicular to a height direction of the battery 10 or the battery cell 110.

Figure 8:
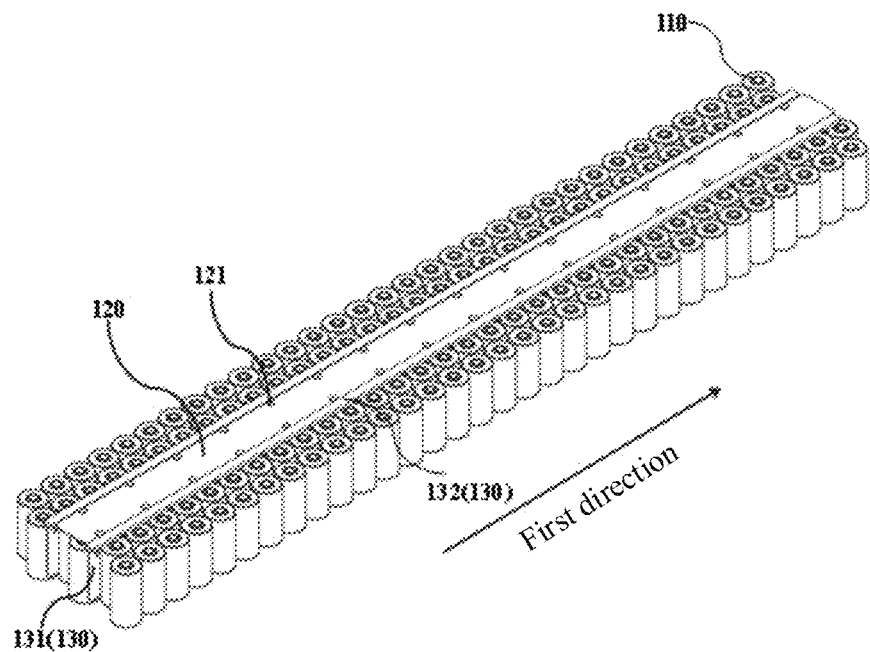
FIG. 8 is a schematic diagram of another partial structure of a battery according to some embodiments of this application.
Figure 9:
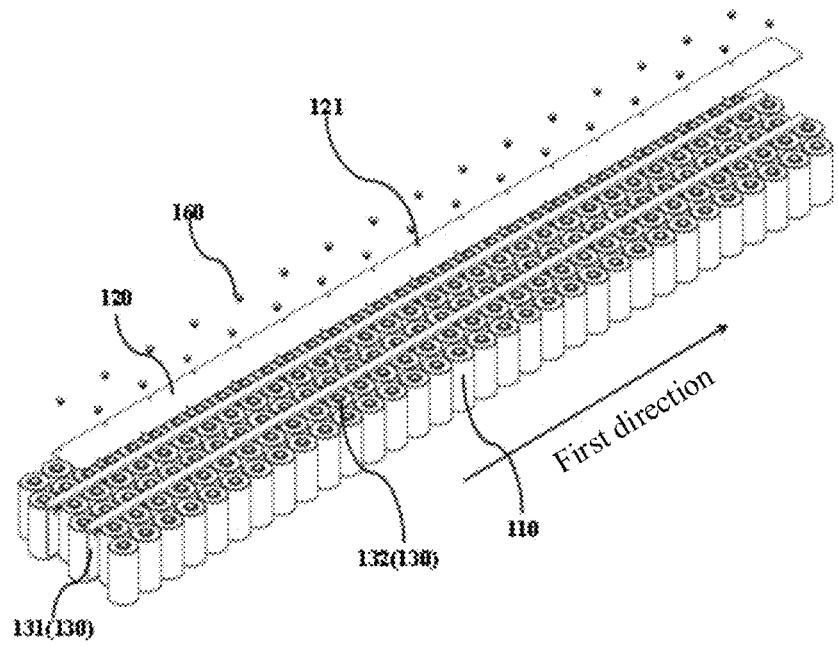
FIG. 9 an assembly diagram of connecting members, battery cells, and a carrying assembly according to some embodiments of this application.

Specifically, as shown in FIG. 6 and FIG. 8, the connecting piece 150 is provided with a first mounting hole 151, and correspondingly, a second mounting hole 121 matching the first mounting hole 151 is provided on the carrying assembly 120, and a fastener 160 fastens the second connecting plate 132 to the carrying assembly 120 via the first mounting hole 151 and the second mounting hole 121, as shown in FIG. 9. The fastener 160 includes but is not limited to a screw, a bolt, and the like. Further, the first mounting hole 151 may alternatively be directly provided on the second connecting plate 132.

In some embodiments, the second connecting plate 132 and the carrying assembly 120 may be bonded or welded together.

In some embodiments, as shown in FIG. 6, the connecting piece 150 is provided on both sides of the second connecting plate 132 in the second direction. The two connecting pieces 150 located on the two sides of the second connecting plate 132 are both provided with the first mounting hole 151, that is, both the connecting pieces 150 are connected to the carrying assembly 120 via the fastener 160, so that forces on two sides of the second connecting plate 132 are more evenly distributed to enhance the connection stability between the second connecting plate 132 and the carrying assembly 120.

In some embodiments, the battery 10 further includes a reinforcing structure 170, where the reinforcing structure 170 connects the second connecting plate 132 to the first connecting plate 131, and the reinforcing structure 170 may be a reinforcement rib or the like. The reinforcing structure 170 is configured to connect a side surface of the first connecting plate 131 in the second direction and a bottom surface of the second connecting plate 132, so as to reduce the possibility of the first connecting plate 131 being broken or damaged, thereby enhancing the connection between the first connecting plate 131 and the second connecting plate 132. Further, when the second connecting plate 132 is provided with the connecting pieces 150 on both sides, the reinforcing structure 170 connects the first connecting plate 131, the second connecting plate 132, and the connecting pieces 150, so as to increase the strength of the connecting pieces 150.

An embodiment of a second aspect of this disclosure provides an electric device, where the electric device includes the battery 10 according to the foregoing embodiments in the first aspect.

The electric device according to this embodiment of this disclosure is motivated by the same inventive concept as the battery 10 according to the foregoing embodiments of the first aspect. Therefore, the electric device in this embodiment of this disclosure is capable of obtaining all of the beneficial effects of the battery 10 according to the foregoing embodiments of the first aspect. The electric device includes but is not limited to a cell phone, a portable device, a laptop computer, a battery car, an electric toy, a power tool, an electric vehicle, a ship, a spacecraft, and the like. For example, the spacecraft includes an aircraft, a rocket, a space shuttle, a spacecraft, and the like.

An embodiment in a third aspect of this disclosure provides a battery manufacturing method, and the battery manufacturing method includes the following steps.

Provide at least one row of battery cells, each row of the battery cells including at least two battery cells arranged along a first direction.

Provide a carrying assembly configured to carry the at least one row of battery cells.

Provide a connecting member, the connecting member including a first connecting plate and a second connecting plate fixedly connected to each other, where the first connecting plate is perpendicular to the second connecting plate, the first connecting plate extends in the first direction, the first connecting plate is connected to at least some battery cells in the at least one row of battery cells, and the second connecting plate is configured to be fixedly connected to the carrying assembly of the battery.

According to the battery manufacturing method provided in this embodiment of this application, in batteries manufactured according to the method, the first connecting plate and the second connecting plate in the connecting member are fixedly connected and disposed perpendicular to each other. The first connecting plate is parallel to each row of battery cells, and side surfaces of the first connecting plate can be fixedly connected to at least two battery cells in one row of battery cells. The second connecting plate can be fixedly connected to the carrying assembly in the battery, so that multiple battery cells can be fastened to the carrying assembly via the connecting member. Since the battery cells are fastened to the connecting member and the connecting member is connected to the carrying assembly, the second connecting plate of the connecting member can provide a connecting plane for the multiple battery cells, so as to increase the connecting area between the multiple battery cells and the carrying assembly, thereby enhancing connection stability between the multiple battery cells and the carrying assembly. In addition, the first connecting plate can restrain the multiple battery cells, thereby enhancing rigidity of the battery and reducing failure probability of the battery.

According to this embodiment of this application, the first connecting plate 131 of the connecting member 130 is parallel to each row of battery cells 110, and side surfaces of the first connecting plate 131 can be fixedly connected to at least two battery cells 110 in one row of battery cells 110. The second connecting plate 132 can be fixedly connected to the carrying assembly 120 in the battery 10, so that the multiple battery cells 110 can be fastened to the carrying assembly 120 via the connecting member 130. In addition, the first connecting plate 131 is provided with a first water cooling channel 1312. Cooling water enters the first water cooling channel 1312 via a first water inlet, and the cooling water absorbs the heat of the battery cells 110 on both sides of the first water cooling channel 1312 to cool down the battery cells 110. Since the battery cells 110 are fastened to the connecting member 130 and the connecting member 130 is connected to the carrying assembly 120, the second connecting plate 132 of the connecting member 130 can provide a connecting plane for the multiple battery cells 110, so as to increase the connecting area between the multiple battery cells 110 and the carrying assembly 120, thereby enhancing connection stability between the multiple battery cells 110 and the carrying assembly 120. In addition, the first connecting plate 131 can restrain the multiple battery cells 110, thereby enhancing rigidity of the battery 10 and reducing failure probability of the battery 10.

The foregoing descriptions are merely some embodiments of this application, but are not intended to limit this application. Any modification, equivalent replacement, or improvement made without departing from the spirit and principle of this application shall fall within the protection scope of this application.

What is claimed is:

1. A battery, comprising:
   at least one row of battery cells, each row of the battery cells comprising at least two battery cells arranged side by side along a first direction;
   a carrying assembly, configured to carry the at least one row of battery cells; and
   a connecting member, the connecting member comprising a first connecting plate and a second connecting plate fixedly connected to each other, wherein the first connecting plate is perpendicular to the second connecting plate,
   wherein
   the first connecting plate extends in the first direction in parallel to each row of battery cells, the first connecting plate is fixedly connected to at least some battery cells in the at least one row of battery cells, and the second connecting plate is configured to be fixedly connected to the carrying assembly of the battery, such that multiple battery cells are fastened to the carrying assembly via the connecting member.

2. The battery according to claim 1, wherein the first connecting plate comprises multiple connection zones, wherein each connection zone is connected to a side surface of at least one battery cell, and the connection zone is a cambered surface.

3. The battery according to claim 1, wherein the second connecting plate is provided with a groove on a side near the first connecting plate, wherein the groove matches the first connecting plate in shape, and part of the first connecting plate is placed in the groove to connect the first connecting plate to the second connecting plate.

4. The battery according to claim 1, wherein the first connecting plate is provided with at least one first water cooling channel inside, wherein the first connecting plate comprises a first water inlet and a first water outlet both communicating with the at least one first water cooling channel.

5. The battery according to claim 4, wherein the battery comprises multiple connecting members, multiple first water inlets in multiple first connecting plates of the multiple connecting members communicate with each other, and multiple first water outlets in the multiple first connecting plates communicate with each other.

6. The battery according to claim 5, wherein the battery further comprises at least one water cooling plate, wherein the water cooling plate is located between at least two rows of battery cells, the water cooling plate is provided with at least one second water cooling channel inside, and the water cooling plate comprises a second water inlet and a second water outlet both communicating with the at least one second water cooling channel.

7. The battery according to claim 6, wherein the second water inlet communicates with the first water inlet, and the second water outlet communicates with the first water outlet.

8. The battery according to claim 1, wherein each row of battery cells comprises endpoint battery cells located at the outermost of two ends in the first direction, and at least one end of the second connecting plate comprising two endpoint battery cells at one end in the first direction extends to inner sides of outer contours of the two endpoint battery cells.

9. The battery according to claim 1, wherein the connecting member is provided between every two adjacent rows of the battery cells.

10. The battery according to claim 1, wherein in a second direction, the battery comprises two rows of battery cells, wherein the connecting members are located on two sides of the two rows of battery cells back away from each other, and the second direction is perpendicular to the first direction.

11. The battery according to claim 1, wherein the second connecting plate is connected to at least some battery cells in at least one row of battery cells.

12. The battery according to claim 1, wherein the battery further comprises a connecting piece, wherein the connecting piece is provided on at least one side of the second connecting plate in the second direction, the second connecting plate is fixedly connected to the carrying assembly via the connecting piece, and the second direction is perpendicular to the first direction.

13. The battery according to claim 12, wherein the battery further comprises a reinforcing structure, wherein the reinforcing structure connects the second connecting plate and the first connecting plate.

14. An electric device, comprising the battery according to claim 1.

15. A battery manufacturing method, comprising:
   providing at least one row of battery cells, each row of the battery cells comprising at least two battery cells arranged side by side along a first direction;
   providing a carrying assembly configured to carry the at least one row of battery cells; and
   providing a connecting member, the connecting member comprising a first connecting plate and a second connecting plate fixedly connected to each other, wherein the first connecting plate is perpendicular to the second connecting plate, the first connecting plate extends in the first direction in parallel to each row of battery cells, the first connecting plate is fixedly connected to at least some battery cells in the at least one row of battery cells, and the second connecting plate is fixedly connected to the carrying assembly of the battery, such that multiple battery cells are fastened to the carrying assembly via the connecting member.

* * * * *